Dec. 6, 1960   W. G. HICKS ET AL   2,963,646
TIME INTERVAL MEASUREMENT
Filed June 2, 1958   3 Sheets-Sheet 1

Dec. 6, 1960

W. G. HICKS ET AL 2,963,646

TIME INTERVAL MEASUREMENT

Filed June 2, 1958

Dec. 6, 1960   W. G. HICKS ET AL   2,963,646
TIME INTERVAL MEASUREMENT
Filed June 2, 1958   3 Sheets-Sheet 3

United States Patent Office 2,963,646
Patented Dec. 6, 1960

2,963,646

TIME INTERVAL MEASUREMENT

Warren G. Hicks, Grand Prairie, and Joseph Zemanek, Jr., Dallas, Tex., assignors, by mesne assignments, to Socony Mobil Oil Company, Inc., New York, N.Y., a corporation of New York Filed June 2, 1958, Ser. No. 739,147

15 Claims. (Cl. 324—68)

This invention relates to time interval measuring and more particularly to methods and apparatus for measuring the elapsed time between the occurrence of transition points of two transients. It is an object of the present invention to provide increased accuracy in determining the elapsed time between the occurrence of two transitions or pulses.

While the present invention is generally applicable to time interval measurement, it is particularly well-suited to velocity well logging systems. In such systems an acoustic pulse is generated downhole and travels through the formations. The time it takes the acoustic pulse to travel through the earth formations between two spaced points is measured in determination of the velocity characteristics of the earth formations. The signals or transients generated by at least one of the transducers in the system are comprised of pulses having sloped leading edges. The leading edge or onset occupies a time interval which is large compared with the resolution with which the desired measurements are to be made. The measuring system may be, and usually is, preset to respond to a certain pulse magnitude, usually intermediate the maximum and minimum values of the pulse. This operation is satisfactory so long as the magnitude of the signal and, hence, the slope of the leading edge remains constant. However, the acoustic pulse is attenuataed to a greater or lesser degree dependent upon the character of the formations being investigated; therefore, the signal magnitudes tend to change, causing a shift in the time required for a selected pulse to reach a given amplitude. The result is an introduction of measeurement error which to an extent is determined by the shift.

It is, therefore, a further object of the present invention to increase accuracy of the measuring system by tracking the transition points of the signals from the transducers and in this manner render the measuring system independent of variation in the magnitude of the signals.

In accordance with the present invention as applied to a time interval measuring system, a control gate is generated upon the occurrence of a selected pulse of one of the transients and at a time between adjacent transition points of the pulse. A square wave is then generated from the selected pulse. This square wave has edges corresponding with alternate transition points of the pulse with at least one of the edges occurring during the duration of the control gate. During the duration of the control gate and upon occurrence of the one edge of the square wave, a trigger signal is generated and applied to the measuring system at a time corresponding with the transition point of the selected pulse.

The edge of the square wave may correspond with a zero crossing transition point of the pulse or may correspond with a peak transition point of the pulse.

More particularly and in accordance with the present invention, there is provided a trigger system for a time interval measuring system including means for measuring the time difference between the occurrence of two transients, a first channel which includes a gating pulse generator responsive to a selected pulse of one of the transients and at a time between adjacent transition points of the selected transient pulse to produce a control gate. A second channel includes means responsive to the aforesaid one of the said transients for producing a square wave at least one edge of which occurs during the duration of the control gate and is representative of a transition point of the selected transient pulse. A trigger signal is generated by means having inputs connected to the first and second channels. The trigger signal, occurring in time coincidence with the edge of the square wave occurring within the time duration of the control gate, is applied to the measuring means.

In another aspect of the present invention, the second channel includes means for changing the time occurrence of the transition points of the selected transient pulse applied to the second channel with respect to the time occurrence of transition points of the same selected transient points in the first channel. In a preferred embodiment, the time-changing means is a delay line.

For other objects and attendant advantages of the present invention, reference may be had to the following detailed description taken in conjunction with the accompanying drawings in which:

Fig. 1 schematically illustrates a logging system embodying the present invention;

Figs. 2, 3, and 4 are diagrammatic illustrations of typical waveforms useful in understanding the present invention;

Figures 1, 2, 3, 4:
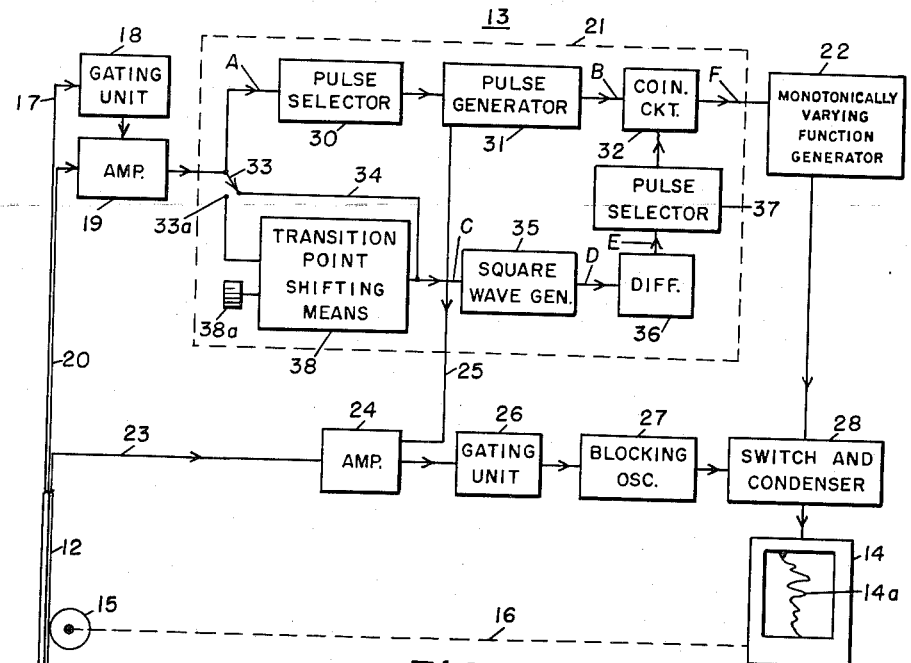

Referring now to Fig. 1, there is illustrated in a wellbore 10 a logging tool 11 of the acoustic velocity type, comprising a transmitter T, a first receiver R1, and a second receiver R2. The receivers R1 and R2 are spaced a fixed predetermined distance from the transmitter T. Acoustic pulses generated by the transmitter T travel by way of the earth formation adjacent the wellbore 10 to the first and second receivers R1 and R2. Upon detection of the acoustic pulses by the receivers, electric signals are generated and applied uphole over a cable 12 to a time interval measuring system 13 which may be of the type described and claimed in United States Patent No. 2,704,364 of Gerald C. Summers. The time interval measuring system 13 generates a signal whose magnitude is representative of the time required for an acoustic pulse to travel through the earth formation from a point opposite receiver R1 to a point opposite receiver R2. The magnitude of this signal, representative of the velocity characteristic of the segment of earth formation between the points, is then recorded by the recorder 14 as one point of a trace 14a. During the course of generation of acoustic pulses, the logging tool 11 is moved in the wellbore and its position indicated by displacement of a chart of the recorder 14 upon which chart the trace 14a is recorded. The chart driving means is here illustrated simply as a sheave 15 coupled by way of a mechanical connection 16 to the recorder 14. The resulting record is a velocity log of the earth formations traversed by the wellbore 10 and useful in the location of oil or gas bearing strata.

In order for the velocity log to be most useful, it should be accurate; but, above all, the information must be consistent and be a true representation of the velocity characteristics of the earth strata traversed by the wellbore. By this is meant that when a limestone strata is traversed by the logging tool and a velocity of 20,000 feet per second recorded, the same velocity will be recorded when another like limestone strata is again traversed further along the wellbore. While velocity well logs heretofore obtained have been found useful for many purposes, results of the accuracy hereby made possible have been difficult to attain in the past. This difficulty is due to the character of the signals generated by the receivers in response to the acoustic energy. These signals are being tracked by the time interval measuring system. The tracking difficulties encountered in velocity well logging may be best illustrated by referring to Fig. 2 where there is represented a portion of a typical waveform or transient generated by a downhole receiver in response to acoustic energy. Time interval measuring systems of the type described in the aforesaid Summers patent may be arranged to respond to either the first or second pulse of the transient A, i.e., either to the first half-cycle or to the second half-cycle. Usually the systems respond to the second pulse by reason of the fact that this pulse is usually of larger magnitude than the first pulse and hence easier to track. For purposes of the description to follow, it will be assumed that the measuring system 13 responds to the second pulse 2A in a manner which will hereinafter be described.

It will be observed that the pulse 2A has a substantially sloped leading edge. Accordingly, where the tracking means of the time interval measuring system is amplitude selective, that is, operative when the selected pulse attains a predetermined level, errors will be introduced whenever the pulse 2A varies in magnitude. These errors can be demonstrated as follows. It is apparent that if the measuring system tracks the pulse 2A at some value between the transition points $x$ and $y$, the instant at which the pulse attains a predetermined level will shift along the time axis $t$ with change in the magnitude of the pulse 2A. The change in pulse magnitude will change the leading-edge slope of the pulse and therefore there will occur a change in the time at which the time interval measuring system 13 will respond. The error introduced by variation in the magnitude of the pulse being tracked can be substantial. To illustrate the order of error magnitude, consider the case where the frequency of the signal or transient A is, for example, of the order of 20,000 cycles per second. One cycle of the signal is 50 microseconds in duration, and the time interval between the adjacent transition points $x$ and $y$ is 12½ microseconds. Therefore, it is conceivable that the time interval measuring system may respond at any time between the transition points $x$ and $y$; and, therefore, there may be introduced in the time measurement an error of 12½ microseconds.

Where the spacing between the first and second receivers R1 and R2 is one foot and the formation under investigation has a velocity characteristic 10,000 feet per second, the time interval being measured will be of the order of 100 microseconds. Accordingly, the error introduced by large variations or swings in the magnitude of the pulse being tracked by a single-receiver logging system or by a two-receiver logging system may be as high as 12½ percent.

The error introduced in the two-receiver system further may be attributed to a number of conditions resulting in the magnitude of a pulse from one receiver being substantially different from the magnitude of a pulse from another receiver. Chief among the causes is unequal gain of the amplifiers 19 and 24, Fig. 1, either by improper setting of the gain, or by variation, over a period of time, in the characteristics of the tubes comprising the amplifiers. Variations in signal magnitude are also introduced when the receivers R1 and R2 straddle an interface as illustrated in Fig. 1. For example, where the strata Z is limestone and the strata Z1 is shale, the signal transmitted by way of the limestone to the first receiver R1 may be substantially higher in magnitude than the signal transmitted by way of the shale to the receiver R2. Thus, even if the amplifiers in the system have the same gain, the signals transmitted to the uphole equipment and tracked by the time measuring system 13 may be of a different order of magnitude.

In accordance with the present invention, the difficulties heretofore encountered in time interval measuring in a velocity well logging system are avoided by assuring that the time interval measuring system will track only at a selected transition point of a selected pulse of the electric signals or transients being generated by the downhole receivers R1 and R2 and will be nonresponsive to amplitude variations of the transients.

In a first embodiment of the present invention, the measuring system tracks a transition point $p$, a zero crossover or transition point of the transient A. A synchronizing pulse generated coincidentally with the generation of an acoustic pulse by the transmitter T, as more fully explained in the aforesaid Patent No. 2,704,364, is applied by way of conductor 17, Fig. 1, of cable 12 to a gating unit 18. The gating unit 18, which may be a multivibrator, applies a gating pulse to an amplifier 19 to open a path from the first receiver R1 by way of conductor 20 to gating unit 21.

A signal or transient A from the first receiver R1, generated in response to the arrival of the acoustic pulse at the receiver, is applied by way of the amplifier 19 to the gating unit 21 which responds to the pulse 2A to produce a control pulse 2F, Fig. 2. The operation of a generator 22 is initiated in response to the control pulse 2F and at a time corresponding with the zero crossing transition point $p$ of the transient or waveform A. Generator 22 then produces an output function which varies monotonically from a predetermined value beginning at the time of the control pulse 2F. A pulse generator 31 included within the gating unit 21 applies a gating pulse by way of conductor 25 to the amplifier 24. Now, upon generation by the second receiver R2 of an electrical signal or transient similar to the waveform A the second gating unit 26 responds to produce a control pulse to trigger a blocking oscillator 27 and operate switch and condenser unit 28 for application to the recorder 14 of a voltage representative of the instantaneous magnitude of the function produced by the monotonic function generator 22. The manner in which the gating units 21 and 26 operate to produce control pulses corresponding with selected ones of the transition points of the pulse 2A will now be described.

Assuming once more that the gating unit 18, Fig. 1, has opened a path by way of amplifier 19 from the first receiver R1 to the gating unit 21, then upon receipt of an acoustic pulse the first receiver R1 generates the waveform or transient A which is applied uphole to a first channel including a pulse selector 30. The pulse selector 30, which may be a half-wave rectifier, passes either negative or positive going pulses. In the present embodiment, the pulse selector 30 passes negative going pulses and hence the first negative going pulse 2A will be applied to the pulse generator 31 which responds to that pulse to produce a control gate 2B, Fig. 2.

The duration of control gate 2B may be one full cycle of the transient A, Fig. 2. When control gate 2B is applied to the coincidence circuit 32, the circuit 32 is conditioned to produce a pulse corresponding in time with the occurrence of the selected transition point $p$. The coincidence circuit has two input circuits, to the first of which is applied the aforementioned gate 2B. The second input of the coincidence circuit 32 is connected to the output of a second channel including means for producing the trigger signal 2F occurring coincidentally with the occurrence of the selected transition point $p$ and during the time occurrence of the control gate 2B. More particularly, the transient A is applied to the pulse selector 30 in the first channel and simultaneously is applied by way of switch 33 and conductor 34 to the input of a square wave generator 35. For purposes of simplification, only a portion of the signal applied to the square wave generator 35 has been illustrated as the negative going pulse 2C in Fig. 2. The pulses 2A and 2C are the same.

The output of the generator 35 is a square wave 2D whose leading and trailing edges correspond with alternate transition points of the transient wave A. More particularly, the edges correspond with the zero-crossing transition points $x$ and $p$. The output of the generator 35 is applied to a pulse shaping means here shown as a differentiating circuit 36. The output, waveform E of the differentiator, is comprised of a positive going pulse 2E and a negative going pulse 2E′. It will be observed from Fig. 2 that the pulse 2E′ occurs during the period of the control gate 2B and at a time coincident with the zero-crossing transition point $p$. Both pulses 2E and 2E′ are applied to a pulse selector 37 which may be of the same type as the pulse selector 30 and which passes either negative or positive pulses. The negative pulse 2E′ is here selected to be passed by the selector 37 and is applied to the second input of the coincidence circuit 32. The coincidence circuit now responds to the pulse 2E′ during the period of the control gate 2B to produce the control pulse 2F which is applied to and triggers the function generator 22.

Similar operation takes place in response to the signal generated by the second receiver R2. The gating unit 26, which is similar to gating unit 21 above-described, produces a control pulse similar to the control pulse 2F at a time corresponding with the occurrence of the zero-crossing transient point $p$ to trigger the blocking oscillator 27 and cause the switch and condenser unit 28 to indicate the value of the function produced by the monotonically varying function generator.

It will be understood that while operations above-described pertain to a velocity logging system of the two-receiver type, the present invention is equally applicable to single-receiver logging. Where it is used in single-receiver logging, only one gating unit, the unit 26, will be required for tracking the output signal from the single receiver. The synchronizing pulse from the transmitter is normally used in such systems to trigger the function generator 22 in the manner described in the aforesaid Summers patent. The synchronizing pulse is very sharp, of short duration, and need not be modified by a gating unit.

It will now be seen that a time measuring system provided with the gating units 21 and 26 of the present invention will track pulses from the receivers independently of the magnitude of the pulses. By rendering the time measuring system responsive only to transition points, either zero-crossing or peak, the measuring system will consistently track the signals in a manner substantially error-free.

Referring now to Fig. 4, there is illustrated the waveforms occurring in a time interval measuring system embodying a preferred modification of the present invention. Such a preferred system employs a transition point shifting means 38 which operates as a time delay line to vary the phase of the signals passing through the first channel of the gating unit 21 relative to the phase of the same signal passing through the second channel of the gating unit 21. More specifically, the time delay line 38 modifies the time relation of the selected transient wave or pulse applied to the second channel with respect to the selected transient wave applied to the first channel. Effectively, the time delay line makes possible a selection of the degree of magnitude of time shift as between the signals in the first and second channels of the gating unit 21. While the description of the effect of the time delay line will be here specifically limited to producing a triggering pulse 4F occurring coincidentally with a zero-crossing transition point of the waveform A, it will be apparent that by changing the amount of delay, the triggering pulse 4F may also be made to occur at a time coincident with a peak transition point of the waveform A. In general, however, the effect of the time delay line may be summarized by saying that it is to displace or shift a selected pulse of the waveform A, more specifically the pulse 4A, to produce a pulse 4C, resulting in the generation of a square wave 4D having leading and trailing edges at least one of which will occur during the time duration of the control gate 4B.

In operation, the waveform 4A, the signal from the first receiver R1, is applied to the pulse selector 30 and like the aforesaid arrangements the pulse generator 31 responds to produce the control gate 4B. The same waveform 4A is also applied to the transition point varying means 38, a time delay line, where it is delayed for a predetermined period, say, for example, 25 microseconds. The pulse 4A then appears at the output of the transition point shifting means 38 as the pulse 4C, 25 microseconds after the zero transition point $x$. The pulse 4C has a zero transition point or onset shown coinciding in time with the zero transition point $p''$ of the pulse 4A. And, likewise, in Fig. 4, the square wave produced at the output of the square wave generator will have a leading edge coinciding in time with the zero transition point $p''$.

It will be understood that the magnitude of delay introduced by the delay line or transition point varying means 38 may be set at any value so long as the zero transition points of the delayed pulse 4C occur within the time duration of the gating pulse 4B. Thus, in the illustration of Fig. 4, assuming that each of the zero transition points of the waveform A occurs at 25 microseconds intervals, it will be evident that the delay line may be set to introduce a delay anywhere in the range of from about 12½ microseconds to more than 37½ microseconds, in which event the first zero transition point of the pulse 4C will occur within the time duration of the control gate 4B. It will now become obvious that if the time duration of the control gate 4B is extended, the range of delay introduced by the delay line may likewise be extended. In practice the pulse 4C has been delayed as much as 50 microseconds.

If it is desired to have the system operate at a time corresponding with the leading edge of the square wave 4D, the pulse selector 37 will be arranged to pass only the positive going pulse 4E from the differentiator 36 to trigger the coincidence circuit 32 and thus cause the production of the control pulse 4F.

Now that the general operation has been described, reference will be made to specific circuits suited for carrying out the present invention and embodying further aspects of the present invention. The circuits while omitting conventional elements, such as, heater filaments, are sufficient to show one skilled in the art how to practice the invention. It will be further understood that where, for example, triodes are shown, pentodes may be preferred and that equivalent pulse generators and other circuit elements may be utilized for those specifically disclosed.

Figure 5:
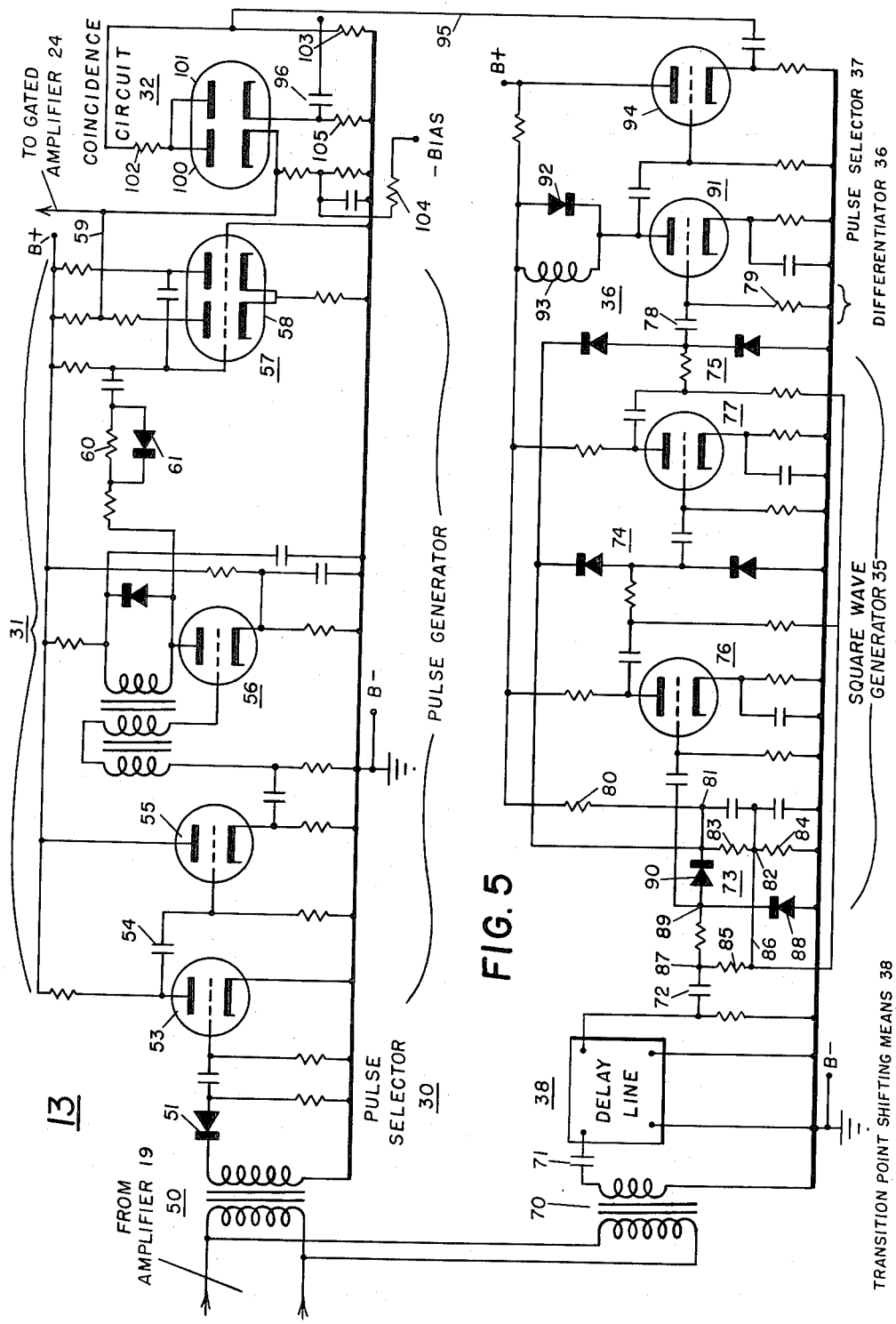
Fig. 5 is a circuit schematic of a preferred embodiment of the present invention.

Referring now to Fig. 5, the gating unit 21 is shown to include an input transformer 50 to which is applied by way of the amplifier 19 of Fig. 1 a signal from the first receiver R1. The signal is modified by pulse selector 30, a half-wave rectifier comprised of rectifier element 51 arranged to pass only negative going pulses of the receiver signal to the input of pulse generator 31. The negative going signals passed by the selector 30 are represented by pulse 4A, Fig. 4.

The pulse selector 30 provides improved operation of velocity logging systems by rendering the systems responsive to the second pulse or half cycle of the receiver signal. The second pulse or half cycle, being of greater amplitude than the first pulse or half cycle, is easier to track and lends greater reliability to the logs produced by the systems. It is a feature of and is specifically described and claimed in co-pending application of Gerald C. Summers, Serial No. 575,541, filed April 2, 1957.

The pulse generator 31 which produces the gating pulse 4B, Fig. 4, in response to the receiver signal includes an input amplifier 53 whose output is applied by way of coupling capacitor 54 to a cathode follower 55. The cathode follower provides a low impedance coupling to blocking oscillator 56 which responds to the output of the cathode follower 55 to produce a pulse of large magnitude adequate to trigger monostable multivibrator 57.

The output of the blocking oscillator 56 is negative-going in character and adequate to cut off the normally conducting stage 58 of multivibrator 57; and in a manner well-known to those skilled in the art, the multivibrator 57 produces in the plate circuit of the stage 58 a positive going gating pulse of the type illustrated by the waveform 4B, Fig. 4. The gating pulse 4B is then applied by way of conductor 59 to an input of coincidence circuit 32 and conditions or otherwise prepares the coincidence circuit 32 to apply the monotonically varying function generator 32 a trigger pulse coinciding in time with a zero-crossing transition point of the input signal from the receiver.

In order to assure the uninterrupted operation of the multivibrator 57, there is provided a disconnect circuit including a high impedance shunted by diode 61 in order effectively to open the input circuit of the multivibrator as soon as generation of the gate 4B has begun. In this manner the negative going pulses which in time follow the pulse 4A and form the negative going pulses of the signal A are ineffective to interrupt the production of gate 4B.

The second channel of the gating unit 21 may also be provided with a transformer input comprised of the transformer 70 whose primary winding is connected in parallel with the primary winding of the transformer 50. The signal from the first receiver is applied by way of coupling capacitor 71 to the delay line 38 which provides for transition point shifting. The delay line 38 may be of the type illustrated in Fig. 6 comprised of a network including inductors L and capacitors C with mutual inductance between the inductors. Suitable delay lines having any desired magnitude of delay may be obtained from the Epsco Company, Boston 15, Massachusetts. The delayed pulse 4C is then applied by coupling capacitor 72 to the square wave generator 35, which may be a saturated amplifier. On the other hand, it may take the illustrated form comprised of a plurality of limiters 73, 74, and 75 and high gain amplifiers 76 and 77. Each of the limiters 73–75 is identical; and, therefore, from the following explanation of one of them, the operation of the others will be understood. The limiter 73 embodies a feature of the present invention in that it is provided with only one source of bias to provide full-wave limiting action. Accordingly, only a negative or positive bias is required.

The limiter 73 is comprised of a pair of rectifying elements 88 and 90 connected in a loop in series circuit with each other and a voltage divider provided by resistors 83 and 84. The juncture between one end of the voltage divider and the rectifying element 88 is at ground potential, while the juncture 81 between the other end of the voltage divider and the rectifying element 90 is tied to a source of bias, in this instance, B+, by way of resistor 80. The use of the B+ supply as a bias is a matter of convenience. A separate source of bias may be employed.

The source of B+ raises the juncture point 81 to some level above ground, for example, 4 volts. The juncture 82 is then raised to some value above ground, for example, 2 volts, by action of the voltage divider comprised of the resistors 83 and 84. By reason of the connection through resistor 85 and conductor 86, juncture point 87 and the connection between rectifying elements 88 and 90 are also, in the absence of current flow, raised to the same potential as the voltage point 82. Accordingly, the signals applied to the limiter 73 from the delay line 38 are raised to an average value above ground. Now, upon a pulse or portion of the signal going negative with respect to ground, current will flow through the diode 88 and limit the juncture point 89 to ground potential. Likewise, upon a pulse or portion of the output signal from the delay line going above the value of the voltage at juncture point 81, diode 90 will conduct to maintain juncture point 89 at the value of the juncture point 81. Accordingly, the signal output of the limiter 73 swings between 4 volts and ground as limits.

In one embodiment of the limiter 73, the rectifying elements 88 and 90 were diodes of the 1N622 type. Resistor 85 had a value of 100K ohms while resistors 83 and 84 each had a value of 187.5 ohms; and the capacitors shunting the resistors 83 and 84 were 5 microfarads in capacity with a voltage rating of 6 volts. The resistor 80 was a 2-watt resistor having a value of 47K ohms. It will be understood that the values set forth above are merely exemplary of one embodiment and that other values may be substituted in the practice of this aspect of the present invention.

The output, pulse 4D, from the square wave generator is applied to the differentiator 36 here shown comprised of capacitor 78 and resistor 79. The resulting pulses 4E and 4E' are amplified by pip amplifier 91. The pip amplifier includes in its plate circuit rectifier 92 and inductance 93 which together provide pulse selector operation for applying to the input of the cathode follower 94 only pulses which are positive going. The positive going pulses are then applied from the cathode circuit of the cathode follower 94 by way of conductor 95 to a second input of the coincidence circuit 32.

It will be recalled that the coincidence circuit 32 has previously been conditioned by the application of the gating pulse 4B thereto. Now upon occurrence of the pulse from the cathode follower 94, the coincidence circuit conducts to produce pulse 4F which is applied by way of coupling capacitor 96 to trigger the monotonically varying function generator 22, Fig. 1.

The coincidence circuit 32 is shown to be of a type commonly referred to as a diode switch circuit and is illustrated in Fig. 10.6 of Waveforms by Chance et al. The coincidence circuit 32 is comprised of two diodes 100 and 101. The plates of both diodes are connected in parallel to ground by way of resistor 102 and resistor 103. The diode 100 is normally conductive by reason of a negative bias being applied to its cathode by way of resistor 103, thus rendering the plate of the diode positive with respect to its cathode. The diode 101 is nonconductive by reason of current flow in diode 100 rendering the plate of diode 101 negative with respect to its cathode. Now upon generation of the gating waveform 4B by the multivibrator 57, the diode 100 is cut off due to the raising of its cathode to a voltage above ground potential. Accordingly, when the positive going pulse from cathode follower 94 is applied to the coincidence circuit 32 by way of conductor 95 and resistor 102, the plate of diode 101 is raised above ground and the diode 101 conducts. The current flowing through the cathode resistor 105 develops the control pulse 4F which is applied by way of coupling capacitor 96 to trigger the monotonically varying function generator 22, Fig. 1.

It will be understood that while the delay line 38 of Fig. 5 has been described as having a fixed time of delay, it may, if desired, be made variable by operation of the knob 38a, Fig. 1. With the delay line made variable, the pulse 4C may have an onset occurring anytime within the time duration of the gating pulse 4B. As set forth above, it is immaterial what value of time delay is selected so long as the above condition is satisfied. With conditions thus satisfied, the time measuring system 13 will track the signals generated by the two receivers in response to a given acoustic pulse at the same time interval after the appearance of the acoustic pulse at the receivers.

A suitable variable delay line may be obtained from the aforesaid Epsco Company.

Figure 7:
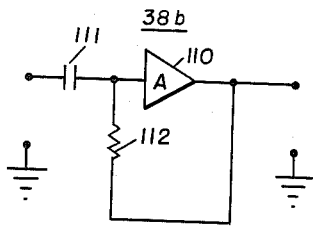
Figs. 7 and 8 illustrate other forms of transition point varying.

In another modification of the present invention, the transition point shifting means was a differentiator 38b of the type shown in Fig. 7 comprised of amplifier 110, capacitor 111, and resistor 112. The differentiator is disclosed in Fig. 18.19(a) at page 650 of Waveforms. The function of the differentiator 38b is to modify the waveform A to produce a pulse 3C, Fig. 3, which when squared by the square wave generator 35, Fig. 1, will result in the square wave 3D having a trailing edge corresponding with the peak transition point $p'$ of pulse 3A.

As assumed before in connection with the prior modification, the pulse selector 30 is arranged to pass only negative going pulses received from the receivers R1 and R2. The pulse generator 31 will then respond to a pulse 3A transmitted from the receiver R1 by way of conductor 20, amplifier 19, and pulse selector 30 to generate a gating pulse 3B. Pulse 3B applied to the coincidence circuit 32 conditions the coincidence circuit for production of a control pulse upon occurrence during the duration of the gating pulse 3B of a trigger signal generated in the following manner.

When an acoustic pulse from the transmitter T reaches the receiver R1, the same signal as applied to the pulse selector 30 is now applied to the transition point varying means 38 which differentiates that signal to produce in its output a pulse 3C. The output of the transition point varying means 38 is applied to the square wave generator 35 and the pulse 3C is squared, resulting in the output of generator 35 of a square wave 3D. The square wave or pulse 3D is differentiated by the differentiator circuit 36 and the output of the differentiator 36, comprising sharp pulses 3E and 3E', is now applied to the pulse selector 37. Because only the negative going pulse 3E', as shown in Fig. 3, occurs during the time of occurrence of the gating pulse 3B, the pulse selector 37 is arranged to pass only the negative pulses. The coincidence circuit now responds to the pulse 3E' to produce the control pulse 3F which is applied to the function generator 22.

The signal from the second receiver R2 is likewise treated by the arrangement comprised of the amplifier 24, the gating unit 26, which like the gating unit 21 includes a transition point varying means, and the blocking oscillator 27 to trigger or gate the switch and condenser unit 28 to effect a sampling of the function generated by the function generator 22. The function thus produced is then applied to the recorder 14.

In one embodiment of the differentiator 38b, the resistance of resistor 112 was 10,000 ohms, the capacitance of capacitor 111 was 100 microfarads, and the amplifier 110 had a gain of 200.

Yet another modification may be employed for tracking the peak transition point of the waveform or transient A. It has been found that the first pulse of the waveform A is generally about half as large in amplitude as the second pulse. With such a relationship, it is possible to integrate the waveform A to produce a pulse 3C' which, it will be noted from Fig. 3, has a zero-crossing transition point corresponding in time with the peak transition point $p'$ of pulse 3A. When this pulse 3C' is shaped to the form of a square wave by the square wave generator 35, there results a square wave 3D', having a trailing edge corresponding with the trailing edge of the pulse 3D and occurring in time with the peak transition point $p'$ of pulse 3A. When the square wave 3D' is differentiated, there is produced two pulses—3E" and 3E'. As stated above, since the pulse 3E' occurs during the time of occurrence of the gating pulse 3B, it will be employed to trigger the coincidence circuit 32.

Figure 8:
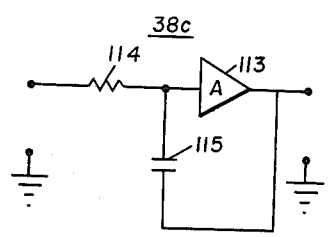

The integrator employed as the transition point varying means 38 may be of the type illustrated in Fig. 8 and identified as 38C. It comprises amplifier 113, resistor 114, and capacitor 115. The integrator 38b is shown and described in Waveforms, Fig. 18.19(b), page 650. In one embodiment, the resistor 114 had a value of 10,000 ohms and the capacitor 115 had a value of 0.001 microfarad. The gain of the amplifier 113 was approximately 200. With such a gain, the effective value C of the capacitor was 0.2 microfarad.

With the transition point varying means 38 comprised of either a differentiator circuit 38b, Fig. 7, or an integrator circuit 38c, Fig. 8, the time interval measuring system 13 tracks only at a peak transition point of the waveform A. More particularly, the systems illustrated will only track at the negative peak transition point $p'$ of pulse 3A. Thus, there is assured, assuming constant frequency for the waveform A, the tracking of a transition point occurring a constant time interval after the onset of the signals from the receivers. With the signals from both receivers assumed to have substantially the same frequency, the time interval measured by the system 13 will be an accurate, reliable representation of the velocity characteristics of the earth strata being investigated.

Figure 9:
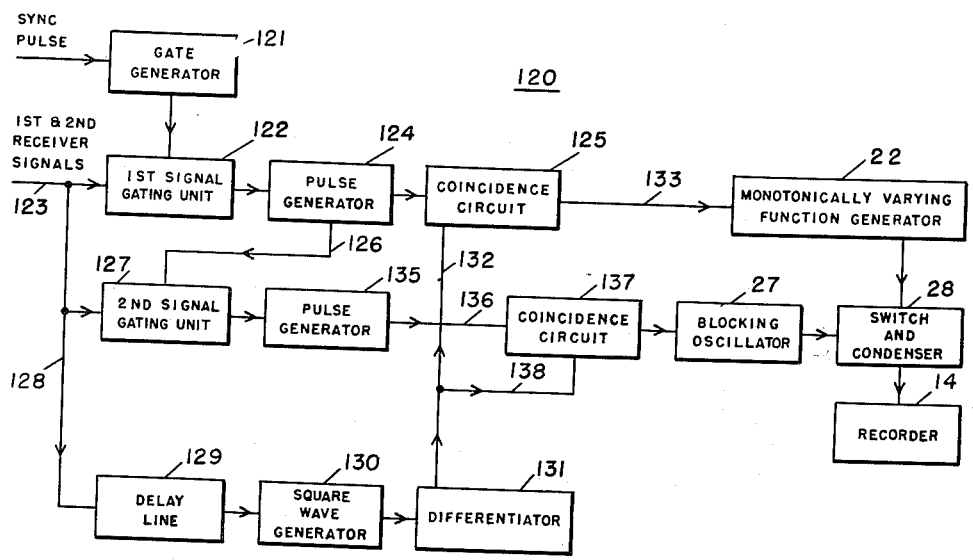
Figure 9 illustrates a different embodiment of the present invention.

While the present invention has been described above in conjunction with a logging system of the type in which separate channels are employed to transmit receiver signals to the surface, it will be understood that the invention is also applicable to logging systems in which receiver signals are sent to the surface over a common channel. Such a system is illustrated in Fig. 9 and will be described in conjunction with the waveforms of Fig. 4. Like the measuring system 13 of Fig. 1, the time interval measuring system 120 of Fig. 9 initiates its operation in response to a sync signal transmitted uphole from the transmitter T, Fig. 1, and applied to a gate generator 121 which produces a signal to open a first signal gating unit 122. Now, upon arrival of the acoustic pulse at the first receiver R1, a signal is applied uphole by way of conductor 123 and the first signal gating unit 122 to pulse generator 124. The pulse generator 124 generates the gating pulse 4B and applies it to a first input of coincidence circuit 125. At the same time a pulse is applied by way of conductor 126 to open a second signal gating unit 127.

The signal from the first receiver is simultaneously applied by way of conductor 128 to a delay line 129 whose output, the delayed pulse 4C, is squared by square wave generator 130 and then differentiated by the differentiator 131 to produce pulse 4E. The pulse 4E occurring at a transition point of the delayed pulse 4C, in this instance the zero-crossing transition point of the pulse, is now applied to a second input of the coincidence circuit 125 as by way of conductor 132. The coincidence circuit 125 produces the control pulse 4F which is applied by way of conductor 133 to trigger or otherwise initiate the operation of the monotonically varying function generator 22.

It will be recalled that the second signal gating unit 127 has been opened in response to a signal from the pulse generator 124 applied by way of conductor 126. Now, upon arrival of the acoustic pulse at the second receiver R2, an electric signal or waveform is applied over the channel comprising the conductor 123 and thence by way of the second signal gating unit 126 to trigger a pulse generator 135. The pulse generator 135, which may be of the same type as the pulse generator 124, produces a gating pulse similar to the pulse 4B which is applied by way of conductor 136 to a first input of the second coincidence circuit 137. The coincidence circuit 137 is now conditioned to receive a control pulse and in response thereto to produce a pulse for application of the instantaneous value of the monotonically varying function to the recorder 14. The control pulse is generated in the same manner as was previously described in conjunction with the signal from the first receiver and as follows: The signal from the second receiver is applied by way of conductor 128 and delay line 129 to the square wave generator 130. The resultant square wave 4D is differentiated by the differentiator 131. The output of the differentiator, the pulse 4E, is applied by way of conductor 138 to a second input of the second coincidence circuit 137. The pulse 4F is generated by the coincidence circuit and is applied to a blocking oscillator 27 to trigger the switch and condenser 28 for application to the recorder 14 of the instantaneous value of the function being generated by the monotonically varying function generator.

Figure 6:
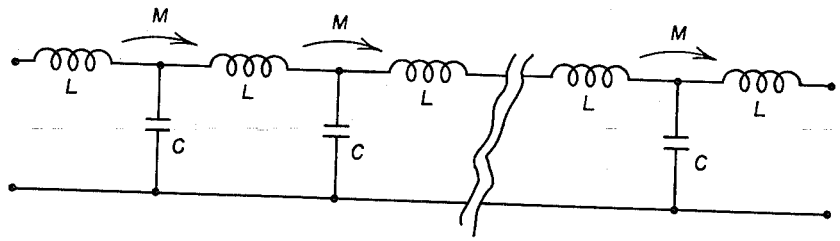
Fig. 6 is a schematic of a delay line.

In yet another modification of the present invention, the transition point shifting means 38, Fig. 1, may be comprised of the differentiator 38b, Fig. 7, and the delay line illustrated in Fig. 6. It will be recalled from the description of the waveforms illustrated in Fig. 3 representing an operation employing the differentiator that the system tracks the first negative peak or transition point p' of the waveform A. In accordance with the present modification, the first positive pulse of waveform A may be tracked, and in the following manner. Assuming that the transition point shifting means 38 includes as a first stage the differentiator 38b, Fig. 7, there will be produced in response to the waveform A the pulse 3C, Fig. 3. The pulse is then applied to a second stage of the transition point shifting means 38 comprised of the delay line of Fig. 6. This effectively produces an operation similar to that illustrated in Fig. 4 and represented by the pulse 4C which it will be observed is now delayed in time with respect to waveform A and to the gating pulse 4B. Thereafter the operation is identical to the operation as described in conjunction with Fig. 4 in which the tracking is responsive to the leading edge of the square wave 4D as distinguished from the tracking of the trailing edge of the square wave as occurs when the transition point shifting means is comprised solely of the differentiator.

In all modifications the time interval measuring system responds to transition points of the receiver signals. Such operation, independent of the amplitudes of the receiver signals, assures the production of a log accurately representing the character of the earth structure traversed by a well bore.

Now that the principles of the invention have been explained and several embodiments fully described, it will be understood that modifications may be made and certain parts may be used in place of other parts all within the scope of the appended claims.

What is claimed is:

1. A trigger system for a time interval measuring system of the type including means for measuring the time difference between the occurrence of two transients, comprising a first channel including a gating pulse generator responsive to a selected pulse of a transient signal and at a time between adjacent transition points of said selected transient pulse to produce a control gate, a second channel including means responsive to said transient for producing a square wave at least one edge of which occurs during the duration of said control gate and representative of a transition point of said selected transient, means having inputs connected to said first and second channels for generating a trigger signal in time coincidence with said edge of said square wave occurring within the time duration of said control gate, said trigger signal having an onset corresponding with one of the transition points of said transient pulse, and means for applying said trigger signal to the measuring means.

2. The system of claim 1 in which said means in said second channel responds to said selected pulse and in which said trigger-signal generating means responds to the trailing edge of said square wave to produce a trigger pulse at a time representative of a zero-crossing transition point of said selected pulse.

3. The system of claim 1 including means for differentiating said square wave to produce control pulses occurring in time coincident with the occurrence of the edges of said square wave, and means for applying to said trigger signal generating means a selected one of said control pulses occurring during the duration of said control gate.

4. The system of claim 1 in which said second channel includes means for changing the time occurrence of transition points of said selected transient wave applied to said second channel with respect to the time occurrence of transition points of said selected transient wave in said first channel.

5. The system of claim 4 in which said time-changing means comprises an integrator and in which said edge of said square wave is the trailing edge whose time of occurrence corresponds with a peak transition point of said selected transient pulse.

6. The system of claim 4 in which said time-changing means comprises a differentiator and said edge of said square wave is the trailing edge whose time of occurrence corresponds with a peak transition point of said selected transient pulse.

7. The system of claim 4 in which said time-changing means is a delay line and in which said square wave producing means responds to said delayed selected pulse to produce a square wave at least one of whose edges corresponds with a transition point of said selected transient pulse.

8. The system of claim 7 in which said edges of said square wave correspond with zero-crossing transition points of said selected transient pulse.

9. A trigger system for a time interval measuring system of the type including means for measuring the time difference between the occurrence of two transients, comprising a first channel including means for selecting a pulse of a transient signal and a gating pulse generator responsive to said selected pulse at a time between adjacent transition points of said pulse to produce a control gate, a second channel including means responsive to said one of said transients for producing a square wave at least one edge of which occurs during the duration of said control gate, means for differentiating said square wave to produce control pulses occurring in time coincident with the occurrences of the edges of said square wave, means for selecting one of said control pulses occurring during the duration of said control gate, and means having inputs connected to said first and said second channels and responsive upon time coincidence of said control gate and said selected control pulse for applying to the measuring means a trigger signal in time coincident with an edge of said square wave.

10. A system of claim 9 in which said second channel includes means for changing the time occurrence of transition points of said selected transient wave applied to said second channel with respect to the time occurrence of transition points of said selected transient signal in said first channel.

11. The system of claim 4 including means for differentiating said square wave to produce control pulses occurring in time coincident with the occurrences of the edges of said square wave, and means for applying to said trigger signal generating means a selected one of said control pulses occurring during the duration of said control gate.

12. The system of claim 1 in which said second channel includes means for differentiating said square wave to produce control pulses occurring in time coincident with the occurrences of the edges of said square wave.

13. A trigger system for a time interval measuring system of the type including means for measuring the time difference between the occurrence of two transients, the improvement which comprises a first channel including a gating pulse generator responsive to a selected pulse of a transient wave and at a time between adjacent transition points of said selected transient pulse to produce a control gate, a second channel including a delay line for changing the occurrence of transition points of said selected transient wave applied to said second channel with respect to the time occurrence of transition points of said selected transient wave in said first channel, means responsive to said transition wave in said second channel for producing a square wave at least one edge of which occurs during the duration of said control gate, a differentiator for producing from said square wave control pulses occurring in time coincident with the occurrence of the edges of said square wave, a half-wave rectifier for passing control pulses of one polarity, and means having inputs connected to said first channel and said second channel and responsive to the coincident of said control gate and said control pulse for applying to the measuring means a signal in time coincident with said control pulse.

14. The system of claim 4 in which said time-changing means comprises a differentiator and a delay line and in which the output of said differentiator is connected to said delay line and further in which said square wave producing means responds to said delayed selected pulse to produce a square wave at least one of whose edges corresponds with a peak transition point of said selected transient pulse.

15. A trigger system responsive only to transition points of selected pulses of transients for a time interval measuring system of the type including means for measuring the time difference between the occurrence of two transients comprising means for generating a control gate upon occurrence of a selected pulse of one of said transients and at a time between adjacent transition points of said pulse, means for converting said selected pulse to a square wave having edges corresponding with alternate transition points of said pulse and at least one of the edges occurring during the duration of said control gate, means responsive to the occurrence of said one edge of said square wave during the duration of said control gate for generating a trigger signal representative of a transition point of said selected pulse, and means for applying said trigger signal to the measuring means.

References Cited in the file of this patent

UNITED STATES PATENTS 2,704,364    Summers  --------------- Mar. 15, 1955

UNITED STATES PATENT OFFICE
CERTIFICATION OF CORRECTION

Patent No. 2,963,646                          December 6, 1960

Warren G. Hicks et al.

It is hereby certified that error appears in the above numbered patent requiring correction and that the said Letters Patent should read as corrected below.

Column 1, lines 40 and 41, for "attenuataed" read -- attenuated --; column 2, line 36, after "varying" and before the semicolon insert -- means --; line 58, for "the" read -- a --; column 3, line 11, "These signals" should start a new paragraph; column 7, line 22, after "apply" insert -- to --; column 8, line 45, column 9, line 9, and column 10, line 2, for "Waveforms", each occurrence, read -- WAVEFORMS --; column 13, line 9, for "occurrence" read -- occurrences --; line 13, for "coincident" read -- coincidence --.

Signed and sealed this 9th day of May 1961.

(SEAL)
Attest:
ERNEST W. SWIDER
Attesting Officer

DAVID L. LADD
Commissioner of Patents